US008630311B2

(12) United States Patent
Mazzarese et al.

(10) Patent No.: US 8,630,311 B2
(45) Date of Patent: Jan. 14, 2014

(54) SYSTEM AND METHOD FOR REPORTING QUANTIZED FEEDBACK INFORMATION FOR ADAPTIVE CODEBOOKS

(75) Inventors: David Mazzarese, Beijing (CN); Yongxing Zhou, Beijing (CN); Yang Tang, San Diego, CA (US); Pengfei Xia, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 217 days.

(21) Appl. No.: 13/102,802

(22) Filed: May 6, 2011

(65) Prior Publication Data

US 2011/0273993 A1 Nov. 10, 2011

Related U.S. Application Data

(60) Provisional application No. 61/332,947, filed on May 10, 2010.

(51) Int. Cl.
*H04J 3/24* (2006.01)
*H04Q 11/04* (2006.01)

(52) U.S. Cl.
CPC .............................. *H04Q 11/0478* (2013.01)
USPC ......................................... 370/474; 370/338

(58) Field of Classification Search
USPC ........................ 370/241–252, 310–350, 474
See application file for complete search history.

(56) References Cited

U.S. PATENT DOCUMENTS

| 8,140,944 | B2* | 3/2012 | Chen et al. ..................... 714/776 |
| 2009/0245169 | A1 | 10/2009 | Zhang et al. |
| 2009/0296850 | A1 | 12/2009 | Xu et al. |
| 2010/0202372 | A1* | 8/2010 | Chun et al. ..................... 370/329 |
| 2010/0315969 | A1* | 12/2010 | Jongren et al. ................ 370/252 |
| 2011/0105046 | A1* | 5/2011 | Molnar et al. .............. 455/67.11 |
| 2011/0176439 | A1* | 7/2011 | Mondal et al. ................ 370/252 |
| 2011/0211482 | A1* | 9/2011 | Hoshino et al. ............... 370/252 |
| 2011/0249643 | A1* | 10/2011 | Barbieri et al. ............... 370/329 |

FOREIGN PATENT DOCUMENTS

| CN | 101610523 A | 12/2009 |
| WO | WO2009/119988 A1 | 10/2009 |
| WO | WO2009/134913 A1 | 11/2009 |

OTHER PUBLICATIONS

International Search Report and Written Opinion of the International Searching Authority, International Application No. PCT/CN2011/073895, Date of mailing: Aug. 18, 2011, 10 pages.

"Introduction of Rel-10 LTE-Advanced features in 36.213," 3GPP TSG-RAN Meeting #63, R1-106557, Nov. 15-19, 2010, 95 pages, Jacksonville, USA.

(Continued)

*Primary Examiner* — Kan Yuen
(74) *Attorney, Agent, or Firm* — Slater & Matsil, L.L.P.

(57) ABSTRACT

A system and method for reporting quantized feedback information for adaptive codebooks include generating channel state information, encoding all or part of the channel state information to produce a feedback payload and transmitting the feedback payload to a base station from a mobile station. The channel state information comprises a rank indicator, a first matrix indicator, a wideband channel quality indicator, a second matrix indicator and at least one narrowband channel quality indicator. When the rank indicator is greater than 1, the first matrix indicator is reported in a second report. On the other hand, when the rank indicator is equal to 1, the content of the first matrix indicator is split between a second report and a third report.

16 Claims, 6 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical layer procedures (Release 9)," 3GPP TS 36.213, V9.1.0, Mar. 2010, 79 pages.

"3rd Generation Partnership Project; Technical Specification Group Radio Access Network; Evolved Universal Terrestrial Radio Access (E-UTRA); Multiplexing and channel coding (Release 9)," 3GPP TS 36.212, V9.0.0, Dec. 2009, 61 pages.

"Comparisons and performance evaluation of adaptive feedback proposals for Rel. 8 PMI enhancements," 3GPP TSG RAN WG1 Meeting #59bis, R1-100115, Agenda Item: 7.2.4.1, Source: Samsung, Documents for: Discussion/Decision, Valencia, Spain, Jan. 18-Jan. 22, 2010, 8 pages..

"Performance of SU/MU MIMO Switching with Multi-Rank Implicit Feedback," 3GPP TSG RAN WG1 59bis, R1-100455, Source: Texas Instruments, Agenda Item: 7.2.4.1, Document for: Discussions and Decision, Valencia, Spain, Jan. 18-22, 2010, 4 pages.

"Generalized transformation for adaptive codebooks," R1-102527, 3GPP TSG RAN WG1 Meeting #60bis, Source: Samsung, Agenda Item: 6.3.4.2, Document for: Discussion/Decision, Beijing, China, Mar. 12-Mar. 16, 2010, 10 pages.

"Double codebook based Differential feedback," 3GPP TSG RAN WG1 meeting #61, R1-103106, Agenda Item: 6.3.4, Source: Huawei, Document for: Discussion and Decision, Montreal, Canada, May 10-14, 2010, 7 pages.

"Double codebook based Differential feedback for MU-MIMO enhancement," 3GPP TSG RAN WG1 meeting #61bis, R1-103449, Source: Huawei, Agenda Item: 6.3.4, Document for: Discussion and Decision, Dresden, Germany, Jun. 28-Jul. 2, 2010, 10 pages.

"Performance evaluations of Rel. 10 4Tx feedback enhancement," 3GPP TSG RAN WG1 Meeting #62, R1-105049, Agenda Item: 6.3.3, Source: Samsung, Document for: Discussion/Decision, Madrid, Spain, Aug. 23-Aug. 27, 2010, 19 pages.

Extended European Search Report, Application No. 11780195.1, Applicant Huawei Technologies Co., Ltd., Apr. 10, 2013, 9 pages.

\* cited by examiner

SYSTEM AND METHOD FOR REPORTING QUANTIZED FEEDBACK INFORMATION FOR ADAPTIVE CODEBOOKS

This application claims the benefit of U.S. Provisional Application No. 61/332,947, filed on May 10, 2010, entitled "Method for Reporting Quantized Feedback for Adaptive Codebook in PUCCH," which application is hereby incorporated herein by reference.

TECHNICAL FIELD

The present invention relates generally to wireless communication systems and methods, and more particularly to a system and method for reporting quantized feedback information for adaptive codebooks.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of standards such as the main $2^{nd}$-Generation (2G) technology Global System for Mobile Communications (GSM), the main $3^{rd}$-Generation (3G) technology Universal Mobile Telecommunications System (UMTS) and the main $4^{th}$-Generation (4G) technology Long Term Evolution (LTE).

In an LTE based wireless communications system, the communications system's capacity may be significantly improved when a transmitter such as a base station in a downlink channel has full or partial knowledge of a channel over which it will be transmitting. Information related to the channel may be referred to as channel state information (CSI). CSI may be obtained by the transmitter over a reverse feedback channel. A receiver such as a mobile station of transmissions made by the transmitter may transmit CSI back to the transmitter over the reverse feedback channel. The receiver may estimate the channel, generate the CSI, and feed the CSI back to the transmitter.

In a 4G LTE system, a reverse feedback channel referred to as a physical uplink control channel (PUCCH) is used to allow receivers to transmit (feedback) channel information to the transmitter serving the receivers. As an example, up to 13 information bits (information prior to encoding) may be transmitted in a single PUCCH packet. Actual PUCCH packet payload is 20 coded bits.

In LTE and earlier compliant communications systems, there may be several types of channel state information including Rank Indicator (RI), Precoding Matrix Indicator (PMI) and Channel Quality Indicator (CQI). CQI can be further divided into two categories, namely wideband CQI (W-CQI) and narrowband CQI (N-CQI). RI is an indication of a number of spatial layers that can be supported by a communications channel. The RI may be fedback infrequently. PMI and W-CQI are indications of channel quality or a codebook quantized version of the channel quality for a wideband channel. The wideband PMI/CQI may be fedback frequently. Moreover, N-CQI is an indication of channel quality for a narrowband channel. The N-CQI may be fedback frequently.

In LTE and earlier compliant communications systems, there may be at least three reports from a mobile station to a base station. Channel state information such as RI, PMI and CQI is allocated into different reports and sent back to the base station through the PUCCH. For example, based upon channel state information, a mobile station may select a matrix indicator in a codebook. Furthermore, through the PUCCH, the mobile station may send the matrix indicator to a base station in a particular report. Based upon the matrix indicator, the base station may perform multi-user multiple input multiple and multiple output (MU MIMO) beamforming.

SUMMARY OF THE INVENTION

These and other problems are generally solved or circumvented, and technical advantages are generally achieved, by preferred embodiments of the present invention which provide a system and method for reporting channel state information for adaptive codebooks.

In accordance with an embodiment, a method for a wireless communications system includes generating a rank indicator, which is sent in a first report, sending a second report comprising a first matrix indicator and a wideband channel quality indictor, and sending a third report comprising a first narrowband channel quality indicator, a second matrix indicator and a channel state information indicator.

In the embodiment, the channel state information indicator is a covariance matrix when the rank indicator has a value equal to 1. On the other hand, the channel state information indicator is a second narrowband channel quality indicator when the rank indicator has a value greater than 1. Furthermore, a reporting period of the first report is longer than a reporting period of the second report; and the reporting period of the second report is longer than a reporting period of the third report. The method further comprises generating channel state information and transmitting the channel state information from a mobile station to a base station serving the mobile station. The channel state information comprises a long term wideband channel statistics report and a short term narrowband channel statistics report.

In accordance with another embodiment, a method for a wireless communications system includes generating a rank indicator, which is sent in a first report, sending a second report comprising a first channel state information indicator and a wideband channel quality indictor, and sending a third report comprising a first narrowband channel quality indicator, a second matrix indicator and a second channel state information indicator.

In the embodiment, when the rank indicator has a value equal to 1, the first channel state information indicator is a plurality of most significant bits of a first matrix indicator and the second channel state information indicator is a plurality of less significant bits of the first matrix indicator. On the other hand, when the rank indicator has a value greater than 1, the first channel state information indicator is a first matrix indicator and the second channel state information indicator is a second narrowband channel quality indicator.

In accordance with yet another embodiment, a method for a wireless communications system includes generating a rank indicator, which is sent in a first report, sending a second report comprising a first matrix indicator and a wideband channel quality indictor, and sending a third report comprising a first narrowband channel quality indicator and a channel state information indicator. The channel state information indicator is a second matrix indicator when the rank indicator has a value equal to 1. On the other hand, the channel state information indicator is a second narrowband channel quality indicator when the rank indicator has a value greater than 1.

In accordance with yet another embodiment, a system for wireless communications includes a mobile station and a base station. The mobile station comprises a channel state information estimate device coupled to a receiver. The channel state information estimate device is configured to calculate channel state information between a base station and the mobile station. The mobile station further comprises a feedback information generator coupled to the channel state information estimate device. Furthermore, the feedback information generator is configured to generate feedback information and encode the feedback information into a feedback payload. The mobile station further comprises a transmit device coupled to the feedback information generator. In addition, the transmit device is configured to send the feedback payload to the base station.

An advantage disclosed herein is that the resolution of feedback information from a mobile station to a base station is improved by splitting channel station information into several reports but keeping the same number of reports as specified by LTE REL-8.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a system and method for reporting channel state information from a wireless device. The invention may also be applied, however, to a variety of wireless systems and devices.

Figure 1:
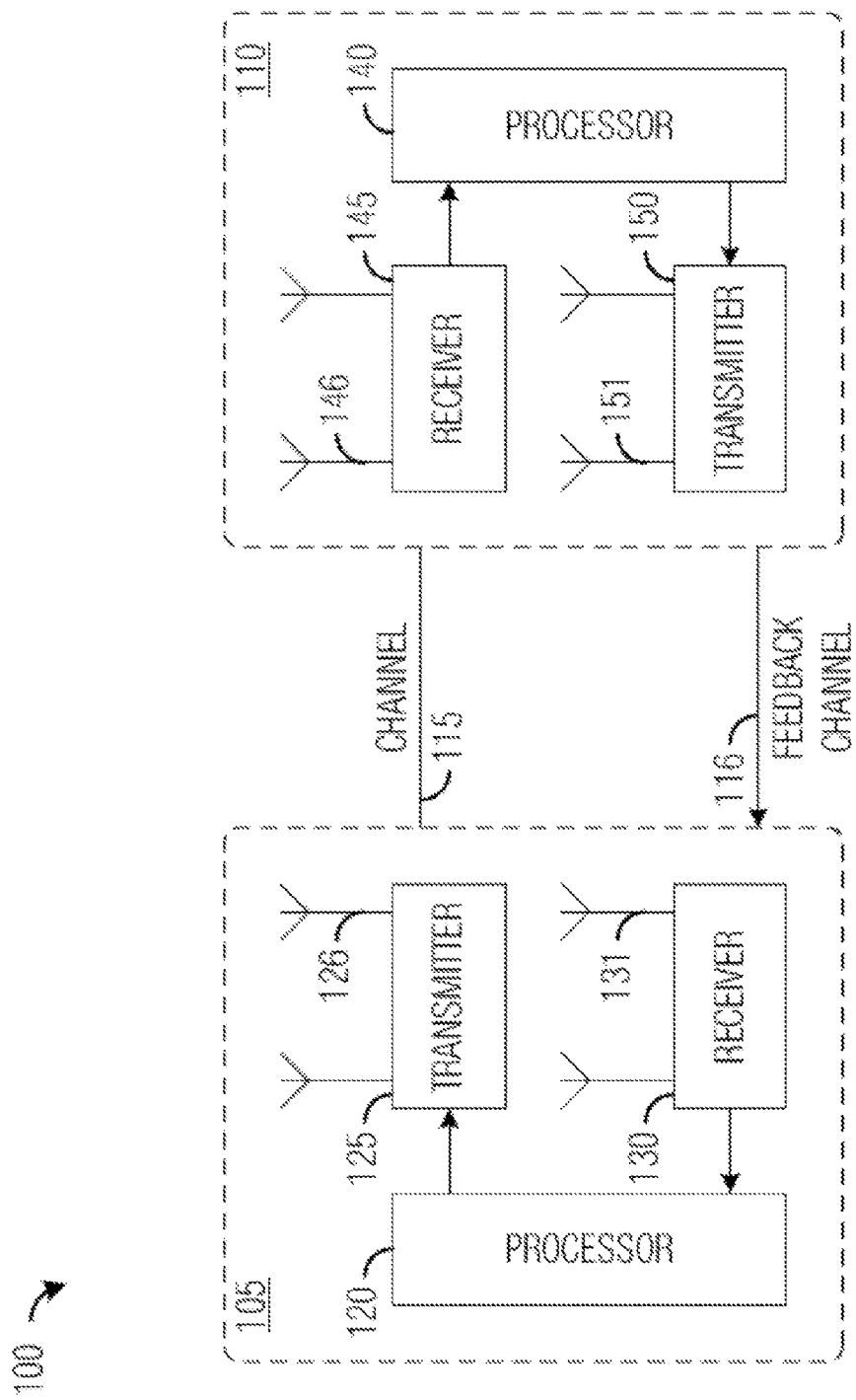
FIG. 1 illustrates a wireless communication system in accordance with an embodiment.

Referring initially to FIG. 1, a wireless network is illustrated. The illustrated wireless network may accommodate $2^{nd}$-Generation (2G) standards such as Global System for Mobile Communications (GSM), $3^{rd}$-Generation (3G) standards such as Universal Mobile Telecommunications System (UMTS) and $4^{th}$-Generation (4G) standards such as Long Term Evolution (LTE).

The wireless network may include a mobile station 110 and a base station 105. The base station 105 communicates with the mobile station 110 over channel 115, and the mobile station 110 feeds back information, including channel information, to the base station 105 over feedback channel 116. Channel 115 may include a downlink channel (from base station 105 to mobile station 110) and an uplink channel (from mobile station 110 to base station 105), while feedback channel 116 may be used by the mobile station 110 to transmit information back to the base station 105. It should be recognized that while FIG. 1 may illustrate the wireless network system having one wireless device and one base station, the wireless network may accommodate any number of wireless devices and base stations and still remain within the scope of the present invention.

The mobile station 110 may be a notebook computer, a mobile phone or a Personal Digital Assistant (PDA), a media player, a gaming device or the like. The base station 105 may include a processor 120, a transmitter 125 and a receiver 130. Furthermore, the transmitter 125 may comprise at least two transmit antennas 126. The receiver 130 may comprise at least one receive antenna 131. Similarly, the mobile station 110 may include a processor 140, a transmitter 150 and a receiver 145. In addition, the transmitter 150 may comprise at least one transmit antenna 151. The receiver 145 may comprise at least one receive antenna 146.

The receiver 145 of the mobile station 110 receives transmissions made by the transmitter 125 of the base station 105 and from the received transmissions. The processor 140 may compute channel state information such as Rank Indicator (RI), Precoding Matrix Indicator (PMI) and Channel Quality Indicator (CQI). The channel state information may be transmitted back to the base station 105, where it is received by the receiver 130. Furthermore, the receiver 130 forwards the channel state information to the processor 120 that makes use of the channel information to design future transmissions such as beamforming. It should be noted that beamforming is a technique for controlling the gain of a plurality of antennas in a specific direction. The gain control can be achieved by controlling the amplitude and phase of the plurality of antennas.

The channel state information described above may be in the form of time domain channel information or frequency domain channel information or a combination thereof. Time domain channel information may be in the form of short term channel information or long term channel information, while frequency domain channel information may be in the form of narrowband channel information or wideband channel information. In general, long term channel information and/or wideband channel information may be collectively referred to as wideband long term channel statistics Likewise, short term channel information and/or narrowband channel information may be collectively referred to as narrowband short term statistics.

Figure 2A:
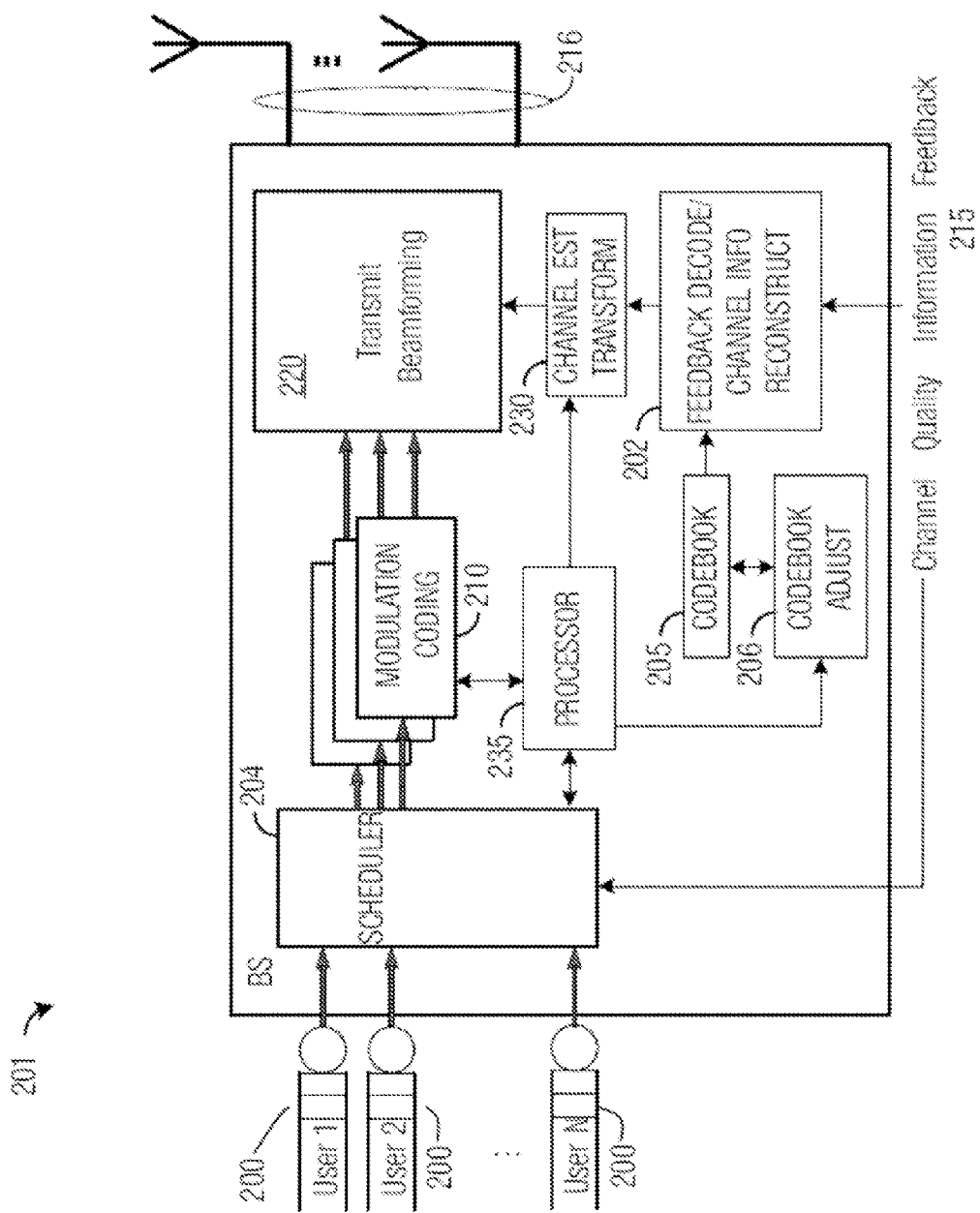
FIG. 2A illustrates a block diagram of a base station in accordance with an embodiment.

FIG. 2A illustrates a base station 201. Data 200, in the form of bits, symbols, or packets for example, destined for a plurality of mobile stations being served are sent to a scheduler 204, which decides which mobile stations will be transmitted to in a given time/frequency opportunity. Data for mobile stations are processed by modulation and coding block 210 to convert to transmitted symbols and add redundancy for the purpose of assisting with error correction or error detection. The modulation and coding scheme is chosen based in part on or in accordance with information about the channel quality information feedback 215.

The output of modulation and coding block 210 is passed to a transmit beamforming block 220, which maps the modulated and coded stream for each mobile station onto a beamforming vector. The beamformed outputs are coupled to antennas 216 through RF circuitry. Feedback decode/channel information reconstruct unit 202 decodes feedback information from channel quality information feedback 215. Feedback decode/channel information reconstruct unit 202 may be referred to simply as a feedback decoder. Decoding feedback information may involve the use of a codebook 205 if channel quality information feedback 215 was quantized using a codebook by a mobile station. Codebook 205 may be a baseline codebook as specified by a technical standard or an adapted codebook that is originally a baseline codebook or another codebook that has been adapted using long term channel information or a function of long term channel information provided by the mobile station.

The channel information being fedback may have different periodicity. As an example, RI feedback may be fedback at a relatively low frequency, as is long term channel information, while wideband PMI/CQI and/or narrowband PMI and/or CQI may be fedback at a relatively high frequency. Feedback decode/channel information reconstruct unit 202 may need to process the received channel quality information feedback 215 differently in accordance with the type of channel information being fedback.

Adaptation of codebook 205 may be performed by codebook adjust unit 206. Codebook adjust unit 206 may adapt codebook 205 using feedback information provided in channel quality information feedback 215. Codebook adjust unit 206 may also make use of transforms stored in a memory to transform a baseline codebook.

Output of feedback decode/channel information reconstruct unit 202 may be provided to channel estimate transform unit 230. Channel estimate transform unit 230 may be used to transform an estimate of the channel to comply with a transformed channel model used at the mobile station. Modulation and coding block 210 may perform any number of coding and modulation techniques. The choice of modulation and coding rate in a preferred embodiment may be made in accordance with channel quality information feedback 215 in a preferred embodiment and may be determined jointly in scheduler 204. A processor 235 may be used to execute applications for the base station 201, and may be used to control the operation of units such as codebook adjust unit 206, channel estimate transform unit 230, modulation and coding block 210, scheduler 204, and so forth.

Figure 2B:
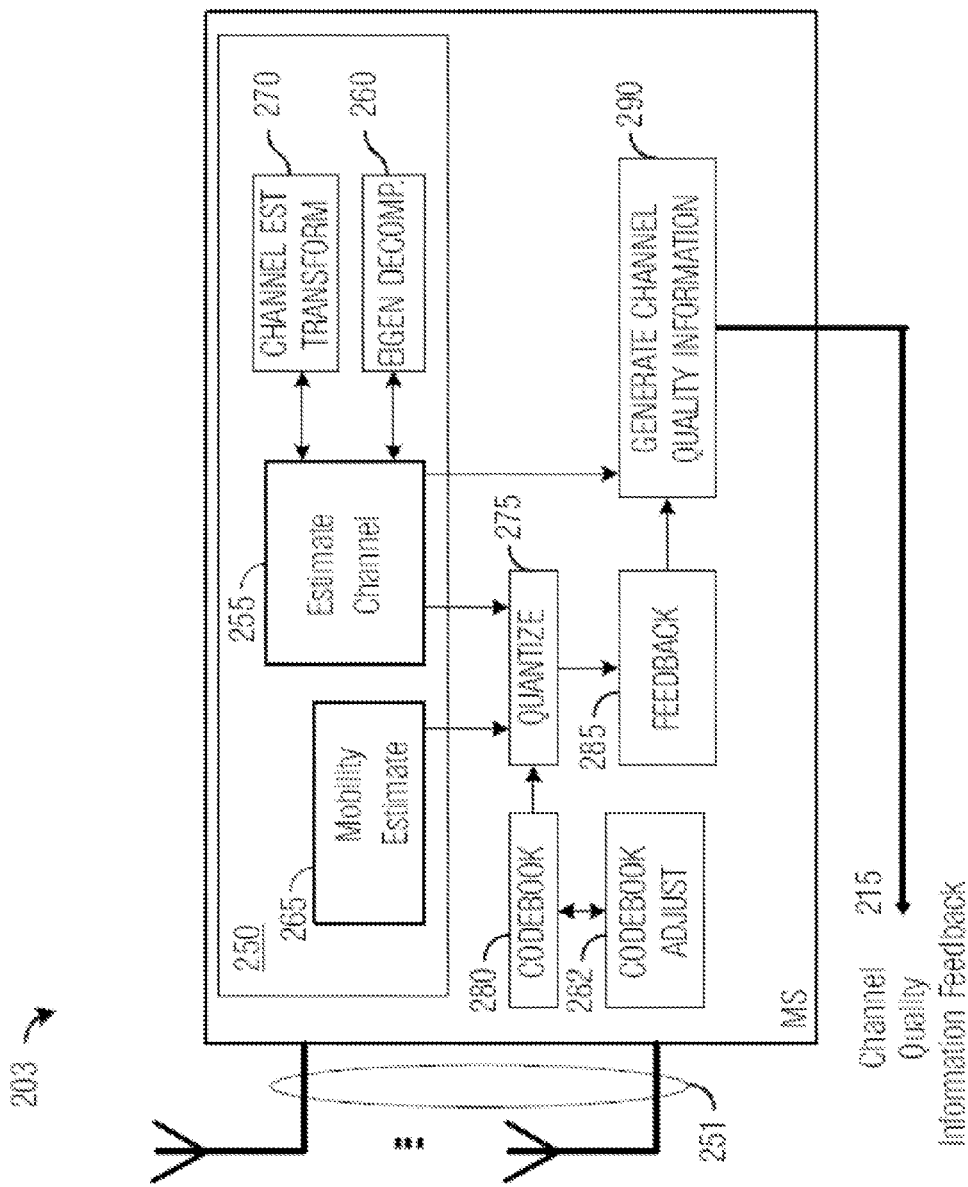
FIG. 2B illustrates a block diagram of a mobile station in accordance with an embodiment.

FIG. 2B illustrates a mobile station 203. The mobile station 203 may have one or more receive antennas 251, connecting through RF circuitry to a receiver signal processing block 250. Some of the key components of receiver signal processing block 250 include channel estimation block 255, eigen decomposition block 260, and a mobility estimate block 265.

Channel estimation block 255 may employ any number of algorithms known in the art such as least squares to estimate a channel between mobile station 203 and its serving base station. Eigen decomposition block 260 may be used to compute eigen components of a spatial domain channel correlation matrix of a channel between the mobile station 203 and its serving base station. According to an example embodiment, eigen decomposition block 260 may make use of eigen decomposition to compute the eigen components from the spatial domain channel correlation matrix provided by channel estimation block 255, which may then be feedback to the base station serving the mobile station 203. According to an example embodiment, in order to reduce the amount of information feedback to the base station, quantization block 275 may quantize the eigenvalues using codebook 280.

Codebook 280 may be a baseline codebook as specified by a technical standard or an adapted codebook that is originally a baseline codebook that has been adapted using long term channel information or a function of long term channel information measured by the mobile station 203. Adaptation of codebook 280 may be performed by codebook adjust unit 282. Codebook adjust unit 282 may adapt codebook 280 using channel information, such as long term channel information measured by the mobile station 203.

In a LTE based wireless communications system, the channel state information between a plurality of mobile stations and a base station may comprise a large amount of data when high resolution is pursued. As a result, the total bits of a report specified by LTE may be not enough to accommodate the channel state information. Thus, some LTE versions such as LTE Rel-8 employ codebook-based precoding. In accordance with LTE Rel-8, the codebook 280 may comprise a plurality of predetermined precoding matrix indicators. Each precoding matrix indicator may also be referred to as a precoding matrix indicator (PMI).

A channel estimate transform block 270 may be used to transform a model of the channel between the base station and the mobile station 203. The transformation of the model of the channel between the base station and the mobile station 203 may allow for a reduction in the amount of channel feedback information by feeding back a different form of channel feedback information that may be amenable to quantization using codebooks as well as reduced dimensionality, which leads to reduced codebook size, thereby increasing codebook resolution while maintaining constant codebook size or reducing codebook size while maintaining codebook resolution.

In sum, channel state information produced from information provided by channel estimation block 255 may be quantized using a quantization block 275. Quantization block 275 quantizes the channel state information using codebook 280. An index from codebook 280 may be output from quantization block 275. An estimate of the amount of channel variation, produced by mobility estimate block 265, may be used to improve the quantization algorithm by initializing the algorithm from a previous quantization level or adjusting the amount of localization.

Feedback block 285 generates a new feedback message by combining the codebook indices output from quantization block 275. Generate channel quality information block 290 generates a special feedback control message employing the outputs of feedback block 285 to produce channel quality information feedback 215. Generate channel quality information block 290 may also apply an error correcting code to protect information in the feedback message from errors.

As specified by LTE release 8 (Rel-8), there may be three configurable periods defined in PUCCH for reporting the channel state information between a mobile station and a base station. These three configurable periods are commonly referred to as the first report, the second report and the third report respectively. In accordance with an embodiment, the first report's reporting period is longer than that of the second report. Likewise, the second report's report period is longer than that of the third report. In other words, the information in the third report may have the highest reporting frequency in comparison with the information in the first and second reports.

Figure 3:
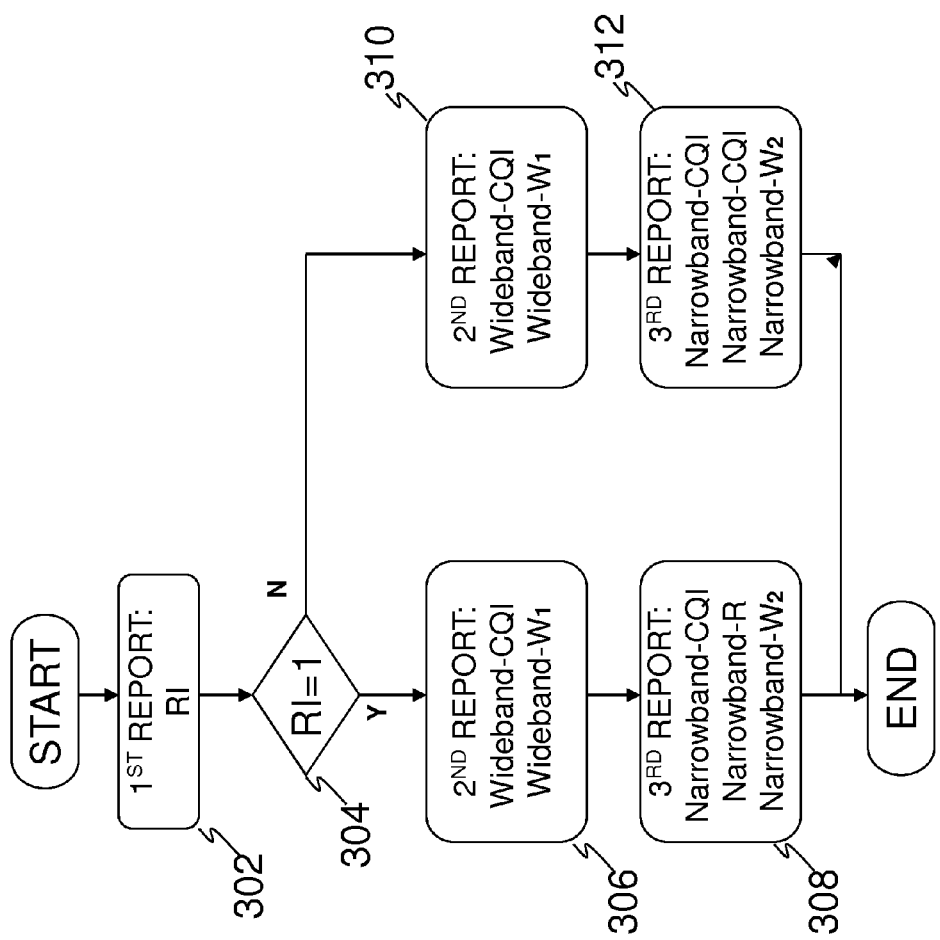
FIG. 3 illustrates a flow diagram of feeding back channel information to a base station in accordance with an embodiment.

FIG. 3 illustrates a flow diagram of feeding back channel information to a base station in accordance with a first embodiment. At step 302, a rank indicator is sent from a mobile station to a base station in a first report wherein the rank indicator shows the number of layers transmitted. At step 304, if the value of the rank indicator is equal to 1, then the algorithm executes step 306 and step 308 wherein a wideband channel quality indicator and a wideband first matrix indicator, which is also referred to as a first precoding matrix indicator (PMI 1), are reported in a second report. Subsequently, a narrow band channel quality indicator, a covariance matrix, which is commonly known as a narrowband R, and a second matrix indicator, which is also referred to as a second precoding matrix indicator (PMI 2) are reported in a third report.

On the other hand, if the value of the rank indicator is greater than 1, the algorithm executes step 310 and step 312. At step 310, the content of the second report is the same as that of the second report shown at step 306. However, because the value of the rank indicator is greater than 1, two codewords may be transmitted to antenna ports. As a result, the mobile station may report two narrowband channel quality indicators. Therefore, at step 312, after accommodating the second narrowband channel quality indicator, the third report may not have space for the narrowband R shown at step 308.

In sum, depending on the value of the rank indicator, in the third report from the mobile station, there is a swap between the narrowband R and the second narrowband channel quality indicator. More particularly, when the rank indicator's value is greater than 1, the mobile station is obligated to report two narrowband channel quality indicators in the third report. There is no space for reporting a narrowband R. On the other hand, when the rank indicator's value is equal to 1, the mobile station may only report one narrowband channel quality indicator. The space for the other narrowband channel quality indicator can be used to report a narrowband R. An advantageous feature of having a swap between a narrowband channel quality indicator and a narrowband R in the third report from a mobile station is that the resolution of channel state information can be improved.

Figure 4:
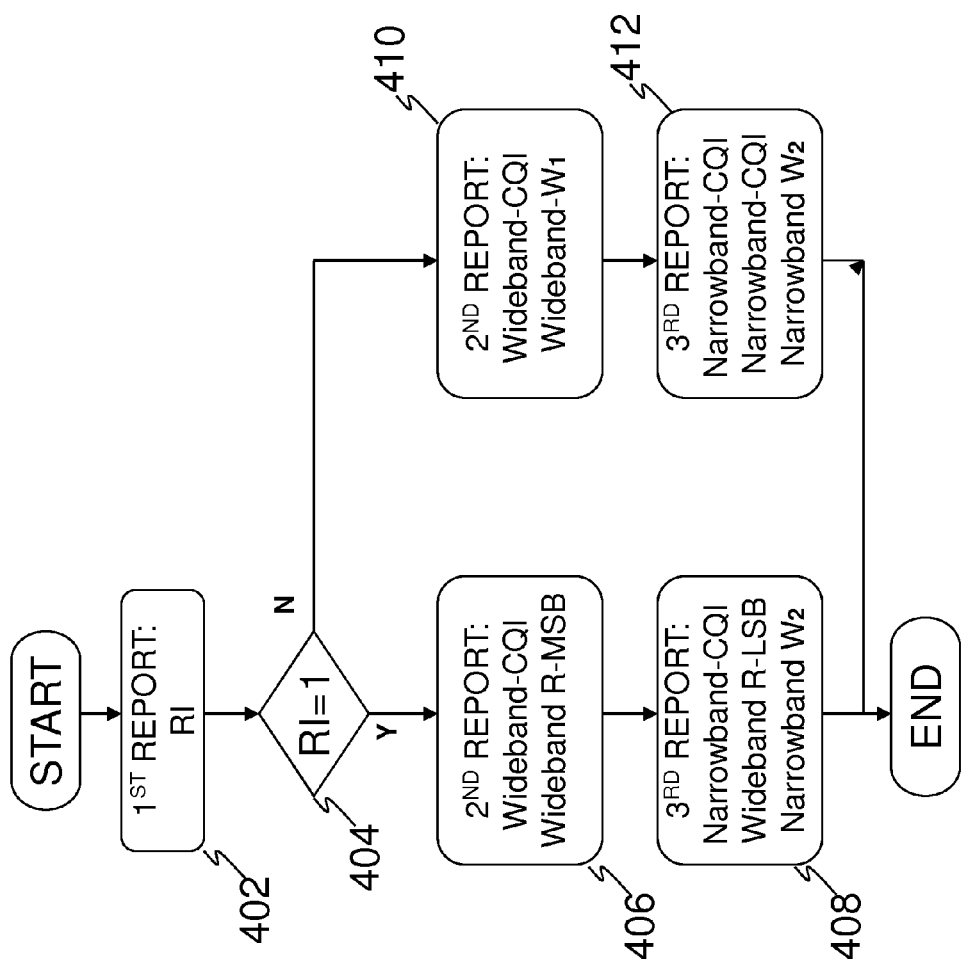
FIG. 4 illustrates a flow diagram of feeding back channel information to a base station in accordance with another embodiment.

FIG. 4 illustrates a flow diagram of feeding back channel information to a base station in accordance with a second embodiment. At step 402, a rank indicator is sent from a mobile station to a base station in a first report wherein the rank indicator shows the number of layers transmitted. At step 404, if the value of the rank indicator is equal to 1, then the algorithm executes step 406 and step 408 wherein a wideband channel quality indicator and the most significant bits of a wideband first matrix indicator are reported in a second report. It should be noted that the wideband first matrix may be a wideband R in accordance with an embodiment. Subsequently, a narrow band channel quality indicator, a second matrix indicator (commonly known as PMI 2) and the rest bits of the wideband first matrix indicator are reported in a third report. The bits of the wideband first matrix indicator are split among different reports. The technique of splitting a matrix indicator into several reports may be referred to as an adaptive codebook technique. On the other hand, if the value of the rank indicator is greater than 1, the algorithm executes step 410 and step 412. At step 410, a wideband channel quality indicator and a first matrix indicator are reported in the second report. Furthermore, because the rank indicator is greater than 1, two codewords may be transmitted to antenna ports. As a result, the mobile station may report two narrowband channel quality indicators. Therefore, at step 412, the content of the third report is similar to that of the third report described in the first embodiment.

In sum, depending on the value of the rank indicator, in the second and third reports from the mobile station, there is a swap between the wideband R and the combination of the second narrowband channel quality indicator and a first matrix indicator. More particularly, when the rank indicator is greater than 1, the mobile station is obligated to report two narrowband channel quality indicators in the third report. There is no space for reporting a wideband R in the third report. On the other hand, when the rank indicator is equal to 1, the mobile station may only report one narrowband channel quality indicator. The space for the other narrowband channel quality indicator can be used to report some bits of the narrowband R. As a result, the bits of the narrowband R can be split between the second report and the third report.

In short, an adaptive codebook is employed by fully utilizing the unoccupied bits, which are reserved for a channel quality indicator when the rank indicator is greater than 1. An advantageous feature of splitting the bits of the narrowband R between the second report and the third report from a mobile station is that the mobile station can provide accurate channel state information by fully utilizing the space the second channel quality indicator. The feedback information from a mobile station to a base station is enhanced by employing a split narrowband R, which may have a large number of bits in comparison with a PMI. In fact, by using a split narrowband R, the feedback quality and coverage of the PUCCH are improved.

Figure 5:
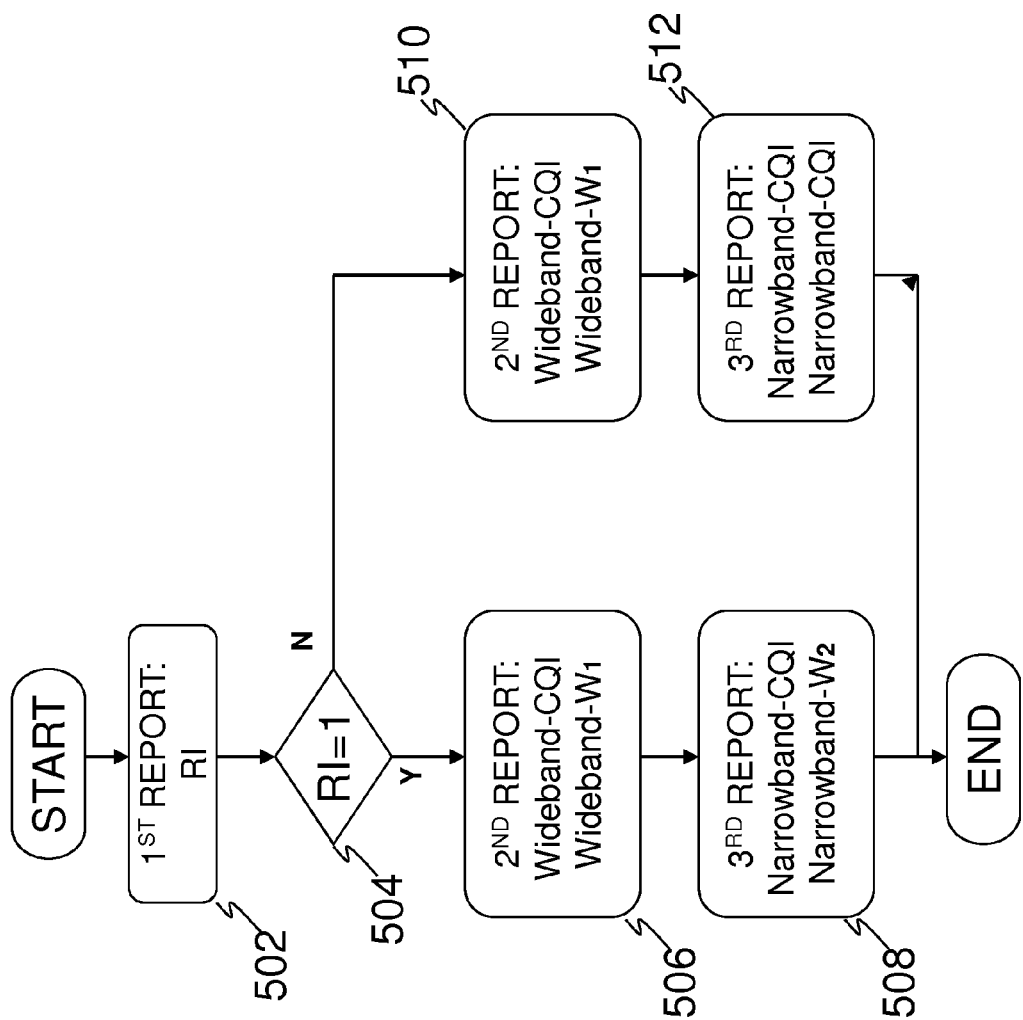
FIG. 5 illustrates a flow diagram of feeding back channel information to a base station in accordance with yet another embodiment.

FIG. 5 illustrates a flow diagram of feeding back channel information to a base station in accordance with a third embodiment. At step 502, a rank indicator is sent from a mobile station to a base station in a first report wherein the rank indicator shows the number of layers transmitted. At step 504, if the value of the rank indicator is equal to 1, then the algorithm executes step 506 and step 508 wherein a wideband channel quality indicator and a wideband first matrix indicator, which is also referred to as a first precoding matrix indicator (PMI 1), are reported in a second report. Subsequently, a narrow band channel quality indicator and a second matrix indicator, which is also referred to as a second precoding matrix indicator (PMI 2) are reported in a third report.

On the other hand, if the value of the rank indicator is greater than 1, the algorithm executes step 510 and step 512. At step 510, the content of the second report is the same as that of the second report shown at step 506. However, because RI is greater than 1, two codewords may be transmitted to antenna ports. As a result, the mobile station may report two narrowband channel quality indicators. Therefore, instead of reporting a PMI 2 at step 512, the third report may comprise the second narrowband channel quality indicator. An advantageous feature of having adaptive codebooks is that when the rank indicator is low, the unoccupied bits of the third report are used to boost the multi-user multiple input and multiple output (MU MIMO) beamforming gain. On the other hand, when the rank indicator is high, the bits of the third report are occupied by a second channel quality indicator so as to boost the single-user multiple input and multiple output (SU MIMO) spatial multiplexing gain.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
generating a rank indicator, wherein the rank indicator is sent in a first report;
sending a second report comprising:
a first channel state information indicator; a first matrix indicator; and
a wideband channel quality indictor, wherein the second report is generated in accordance with the rank indicator of the first report; and
sending a third report comprising:
a second channel state information indicator; a first narrowband channel quality indicator; a second matrix indicator; and a third channel state information indicator, wherein the third report is generated in accordance with the rank indicator of the first report;
wherein when the rank indicator has a value equal to 1, the first channel state information indicator is a plurality of most significant bits of a first matrix indicator; and the second channel state information indicator is a plurality of less significant bits of the first matrix indicator.

2. The method of claim 1, wherein the third channel state information indicator is a covariance matrix when the rank indicator has a value equal to 1.

3. The method of claim 1, wherein the third channel state information indicator is a second narrowband channel quality indicator when the rank indicator has a value greater than 1.

4. The method of claim 1, wherein a reporting period of the first report is longer than a reporting period of the second report; and the reporting period of the second report is longer than a reporting period of the third report.

5. The method of claim 1, further comprising:
generating the third channel state information indicator comprising:
a long term wideband channel statistics report; and
a short term narrowband channel statistics report; and
transmitting the channel state information from a mobile station to a base station serving the mobile station.

6. A method comprising:
generating a rank indicator, wherein the rank indicator is sent in a first report;
sending a second report comprising:
a first channel state information indicator; and a wideband channel quality indictor, wherein the second report is generated in accordance with the rank indicator of the first report; and
sending a third report comprising:
a first narrowband channel quality indicator; a second matrix indicator; and
a second channel state information indicator, wherein the third report is generated in accordance with the rank indicator of the first report;
wherein when the rank indicator has a value equal to 1, the first channel state information indicator is a plurality of most significant bits of a first matrix indicator; and the second channel state information indicator is a plurality of less significant bits of the first matrix indicator.

7. The method of claim 6, wherein when the rank indicator has a value greater than 1, the first channel state information indicator is a first matrix indicator; and the second channel state information indicator is a second narrowband channel quality indicator.

8. The method of claim 6, wherein a reporting frequency of the first report is lower than a reporting frequency of the second report; and the reporting frequency of the second report is lower than a reporting frequency of the third report.

9. The method of claim 6, further comprising: generating channel state information comprising: a long term wideband channel statistics report; and a short term narrowband channel statistics report.

10. The method of claim 9, wherein the long term wideband channel statistics report comprises a rank indicator, a first matrix indicator and a wideband channel quality indicator.

11. The method of claim 9, wherein the short term narrowband channel statistics report comprises a second matrix indicator and a narrowband channel quality indicator.

12. A method comprising:
generating a rank indicator, wherein the rank indicator is sent in a first report;
sending a second report comprising:
a first channel state information indicator; a first matrix indicator; and a wideband channel quality indictor, wherein the second report is generated in accordance with the rank indicator of the first report; and
sending a third report comprising:
a second channel state information indicator; a first narrowband channel quality indicator; and a third channel state information indicator, wherein the third report is generated in accordance with the rank indicator of the first report;
wherein when the rank indicator has a value equal to 1, the first channel state information indicator is a plurality of most significant bits of a first matrix indicator; and the second channel state information indicator is a plurality of less significant bits of the first matrix indicator.

13. The method of claim 12, wherein the third channel state information indicator is a second matrix indicator when the rank indicator has a value equal to 1.

14. The method of claim 12, wherein the third channel state information indicator is a second narrowband channel quality indicator when the rank indicator has a value greater than 1.

15. The method of claim 12, further comprising: generating the third channel state information indicator comprising: a long term wideband channel statistics report; and a short term narrowband channel statistics report; encoding all or part of the channel state information to produce a feedback payload; and transmitting the feedback payload to a communication server serving a communication device.

16. The method of claim 15, wherein the long term wideband channel statistics report comprises: a rank indicator; a first matrix indicator; and a wideband channel quality indicator; and the short term narrowband channel statistics report comprises: a second matrix indicator; and a narrowband channel quality indicator.

\* \* \* \* \*

UNITED STATES PATENT AND TRADEMARK OFFICE
CERTIFICATE OF CORRECTION

PATENT NO. : 8,630,311 B2
APPLICATION NO. : 13/102802
DATED : January 14, 2014
INVENTOR(S) : David Jean-Marie Mazzarese et al.

It is certified that error appears in the above-identified patent and that said Letters Patent is hereby corrected as shown below:

In the Claims

In Col. 9, line 29, claim 1, delete "indictor" and insert --indicator--.
In Col. 9, line 65, claim 6, delete "indictor" and insert --indicator--.
In Col. 10, line 38, claim 12, delete "indictor" and insert --indicator--.

Signed and Sealed this
Sixth Day of May, 2014

Michelle K. Lee
*Deputy Director of the United States Patent and Trademark Office*